(12) United States Patent
Saavedra et al.

(10) Patent No.: US 8,092,920 B2
(45) Date of Patent: Jan. 10, 2012

(54) HIGH CLARITY, HIGH STIFFNESS FILMS

(75) Inventors: Jose V. Saavedra, Lake Jackson, TX (US); Rajen Patel, Lake Jackson, TX (US); Varun Ratta, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 926 days.

(21) Appl. No.: 10/527,142

(22) PCT Filed: Aug. 14, 2003

(86) PCT No.: PCT/US03/25395
§ 371 (c)(1),
(2), (4) Date: Mar. 9, 2005

(87) PCT Pub. No.: WO2004/024433
PCT Pub. Date: Mar. 25, 2004

(65) Prior Publication Data
US 2006/0057410 A1    Mar. 16, 2006

Related U.S. Application Data

(60) Provisional application No. 60/411,092, filed on Sep. 16, 2002.

(51) Int. Cl.
*B32B 27/08* (2006.01)
(52) U.S. Cl. ......... 428/515; 428/516; 428/517; 428/910
(58) Field of Classification Search ................... 428/516, 428/515, 517, 910
See application file for complete search history.

(56) References Cited

U.S. PATENT DOCUMENTS

| | | | |
|---|---|---|---|
| 3,555,604 A | 1/1971 | Pahlke | 18/14 |
| 3,645,992 A | 2/1972 | Elston | 260/80.78 |
| 3,959,425 A | 5/1976 | Herrington | 264/89 |
| 4,076,698 A | 2/1978 | Anderson et al. | 526/348.6 |
| 4,194,039 A | 3/1980 | Mueller | 428/213 |
| 4,429,079 A | 1/1984 | Shibata et al. | 525/240 |

(Continued)

FOREIGN PATENT DOCUMENTS

CA    972511    8/1975
(Continued)

*Primary Examiner* — Kevin R. Kruer
(74) *Attorney, Agent, or Firm* — Whyte Hirschboeck Dudek SC

(57) ABSTRACT

A multi-layer heat film having at least three layers is disclosed wherein the film has high optical properties, high stiffness and desirable shrinkage in the cross direction. The inner layer, or layers, comprises at least one stiffening polymer selected from the group consisting of: low density polyethylene, linear low density polyethylene, high density polyethylene, blends thereof, polypropylene random copolymer, styrene/butadiene copolymer, polystyrene/butadiene copolymer, polystyrene, ethylene-vinyl acetate copolymer and cyclic-olefin copolymer, provided that when more than one inner layer is present, the inner layers can be the same or different. The skin layers, which may be the same or different, comprise at least one of: low density polyethylene; a blend of low density polyethylene and linear low density polyethylene; a blend of low density polyethylene and very low density polyethylene; polystyrene; ethylene-vinyl acetate copolymer; a blend of ethylene-vinyl acetate copolymer and linear low density polyethylene; cyclic-olefin copolymer; styrene-butadiene copolymer; or, polypropylene random copolymer, provided that the skin layers are devoid of a homogeneously branched polyethylene resin prepared with a single site catalyst. The inventive films have haze values of less than about 15%, a 2% secant modulus renter than about 50,000 psi and a cross directional shrinkage greater than 0%. The inventive films are made by a process that does not include post-extrusion bi-axial orientation.

21 Claims, 2 Drawing Sheets

Modulus vs. Density of Polyethylenes
Compression Molded Plaques

Log(Modulus) = -130.0787+270.267*den-134.832*den*den, r²=0.99

U.S. PATENT DOCUMENTS

| | | | |
|---|---|---|---|
| 4,532,189 A | 7/1985 | Mueller | 428/516 |
| 4,574,104 A * | 3/1986 | Aishima et al. | 428/220 |
| 4,820,471 A | 4/1989 | van der Molen | 264/564 |
| 4,828,928 A * | 5/1989 | Shah | 428/518 |
| 4,863,769 A | 9/1989 | Lustig et al. | 428/34.9 |
| 4,865,902 A | 9/1989 | Golike et al. | 428/215 |
| 4,886,698 A * | 12/1989 | Purdy | 428/213 |
| 4,963,427 A | 10/1990 | Botto et al. | 428/215 |
| 5,006,398 A | 4/1991 | Banerji | 428/220 |
| 5,023,143 A | 6/1991 | Nelson | 428/516 |
| 5,059,481 A | 10/1991 | Lustig et al. | 428/39.9 |
| 5,091,228 A * | 2/1992 | Fujii et al. | 428/34.3 |
| 5,158,836 A | 10/1992 | Schirmer et al. | |
| 5,284,613 A | 2/1994 | Ali et al. | 264/566 |
| 5,595,705 A | 1/1997 | Walton et al. | 264/456 |
| 5,614,315 A | 3/1997 | Kondo et al. | 428/332 |
| 5,714,547 A | 2/1998 | Li et al. | 525/240 |
| 5,852,152 A | 12/1998 | Walton et al. | 526/348.1 |
| 5,888,660 A | 3/1999 | Landoni et al. | 428/516 |
| 5,897,941 A * | 4/1999 | Shah | 428/213 |
| 5,989,725 A * | 11/1999 | Bullard et al. | 428/516 |
| 6,187,397 B1 | 2/2001 | Grangette | 428/34.9 |
| 6,268,044 B1 | 7/2001 | Grangette | 428/213 |
| 6,423,421 B1 | 7/2002 | Banaszak et al. | 428/516 |
| 6,451,446 B1 | 9/2002 | Regnier | 428/515 |
| 6,835,462 B2 * | 12/2004 | Sun et al. | 428/515 |
| 6,960,375 B2 * | 11/2005 | Giblin et al. | 428/35.7 |
| 2001/0046606 A1 | 11/2001 | Tau et al. | 428/516 |
| 2002/0127421 A1 | 9/2002 | Fukada et al. | 428/516 |
| 2003/0096128 A1 * | 5/2003 | Farley et al. | 428/500 |
| 2003/0113496 A1 * | 6/2003 | Harris et al. | 428/36.9 |

FOREIGN PATENT DOCUMENTS

| | | |
|---|---|---|
| JP | 63-194928 | 8/1988 |
| JP | 2001-001468 | 1/2001 |
| WO | 01/92403 A2 | 12/2001 |

* cited by examiner

3 Layer Beverage Shrink Film (A/B/A)

3 Layer Beverage Shrink Film (A/B/A)

HIGH CLARITY, HIGH STIFFNESS FILMS

This application is a national stage application of international patent application No. PCT/US03/25395 filed Aug. 14, 2003, which claims the benefit of U.S. provisional patent application 60/411,092, filed Sep. 16, 2002.

This invention relates generally to heat films, and more specifically to providing multilayer hot-blown heat shrink films having high optics, high stiffness and desirable shrinkage.

Multilayer heat shrink films are known in the art. For example, U.S. Pat. No. 5,852,152 describes the use of low density polyethylene (LDPE) in the core and substantially linear, homogeneously branched, single site resins in the skin layers. This film gave excellent optics and good shrinkage but low film stiffness.

U.S. Pat. No. 6,187,397 B1 discloses a high clarity multilayer heat-shrinkable film comprising a central layer composed of a mixture, of LDPE and conventional linear low density polyethylene (LLDPE) with a relative density of between 0.922 and 0.930 g/cm³, sandwiched between two outer layers. Each of the outer layers comprises at least 50% by weight, with respect to the total weight of the polymers present in the layer, of conventional LLDPE with a relative density of between 0.918 and 0.930 g/cm³ and is devoid of any metallocene linear polyethylene, each of the outer layers having a thickness representing from 5% to 25% of the total thickness of the film.

U.S. Pat. No. 6,268,044 B1 discloses a heat-shrinkable polyethylene film comprising a central layer sandwiched between two outer layers, wherein: the central layer is composed of a mixture of LDPE, conventional LLDPE and one ionomer and at least representing at least 50% by weight of the one mixture and said central layer representing at least 30% of the total thickness of the film; and the outer layers which are identical or different, are composed of a mixture of LDPE and conventional LLDPE, the LLDPE representing more than 50% by weight of the mixture.

U.S. Pat. No. 5,714,547 (Li et al.) discloses blends of high density polyethylene (HDPE), plastomer and ethyl vinyl alcohol (EVA) resin in a monolayer film to have medium to high clarity films.

However, there is still a need for a shrink film that has a combination of good optics, shrinkage and stiffness properties that can be made without using expensive resin prepared with a single site catalyst and/or without expensive post-extrusion orientation process steps.

The current invention is a multilayer hot-blown film having a combination of good optics, high stiffness and moderate shrinkage that can be made without expensive double-bubble or tenter-frame processes, and the processes for making such a film. A hallmark of the inventive films is that the skin layers are devoid of a resin prepared with a single site catalyst. Shrink films are especially preferred in this invention.

In one preferred embodiment, the invention is a coextruded hot-blown shrink film having at least three layers, the film comprising a core layer and, optionally, at least one intermediate layer sandwiched between two skin layers, the film having a haze value of less than about 15%, a 2% secant modulus greater than about 50,000 psi, preferably greater than about 60,000 psi, more preferably greater than about 70,000 psi, most preferably greater than about 80,000, and especially greater than about 100,000 psi, and a cross-directional (CD) shrinkage greater than 0%, preferably between 0% and about 50%. Such a film is obtainable when: (a) the inner layer, or layers, comprises at least one stiffening polymer selected from the group consisting of: low density polyethylene, linear low density polyethylene, high density polyethylene, blends thereof, polypropylene homopolymer, polypropylene random copolymer, styrene/butadiene copolymer, polystyrene, ethylene-vinyl acetate copolymer and cyclic-olefin copolymer, provided that when more than one inner layer is present, the inner layers can be the same or different; and, (b) the skin layers, which may be the same or different, comprise at least one of: low density polyethylene; a blend of low density polyethylene and linear low density polyethylene; a blend of low density polyethylene and very low density polyethylene; polystyrene; ethylene-vinyl acetate copolymer; a blend of ethylene-vinyl acetate copolymer and linear low density polyethylene; cyclic-olefin copolymer, styrene-butadiene copolymer; or, polypropylene homopolymer, polypropylene random copolymer, provided that the skin layers are devoid of a homogeneously branched polyethylene resin prepared with a single site catalyst.

In another preferred embodiment, the invention is a coextruded hot-blown film having at least three layers, the film comprising a core layer and, optionally, at least one intermediate layer sandwiched between two skin layers, the film having a haze value of less than about 5%, a 2% secant modulus greater than about 50,000 psi, preferably greater than about 60,000 psi, more preferably greater than about 70,000 psi, most preferably greater than about 80,000, and especially greater than about 100,000 psi, and a cross-directional (CD) shrinkage greater than 0%, preferably between 0% and about 50%. Such a film is obtainable when: (a) the inner layer, or layers, comprises at least one stiffening polymer selected from the group consisting of: low density polyethylene, linear low density polyethylene, high density polyethylene, blends thereof, polypropylene homopolymer, polypropylene random copolymer, styrene/butadiene copolymer, polystyrene, ethylene-vinyl acetate copolymer and cyclic-olefin copolymer, provided that when more than one inner layer is present, the inner layers can be the same or different; and, (b) the skin layers, which may be the same or different, comprise at least one of: low density polyethylene; a blend of low density polyethylene and linear low density polyethylene; a blend of low density polyethylene and very low density polyethylene; polystyrene; ethylene-vinyl acetate copolymer; a blend of ethylene-vinyl acetate copolymer and linear low density polyethylene; cyclic-olefin copolymer; styrene-butadiene copolymer, or, polypropylene random copolymer, provided that the skin layers are devoid of a homogeneously branched polyethylene resin prepared with a single site catalyst.

In another preferred embodiment, the invention is a process for preparing a film having at least 3 layers, the process comprising the step of coextruding, via a hot-blown film process, a film comprising at least one inner layer between two skin layers, wherein: (a) the inner layer, or layers, comprises at least one stiffening polymer selected from the group consisting of: low density polyethylene, linear low density polyethylene, high density polyethylene, blends thereof, polypropylene homopolymer, polypropylene random copolymer, styrene/butadiene copolymer, polystyrene, ethylene-vinyl acetate copolymer and cyclic-olefin copolymer, provided that when more than one inner layer is present, the inner layers can be the same or different; and, (b) the skin layers, which may be the same or different, comprise at least one of: low density polyethylene; a blend of low density polyethylene and linear low density polyethylene; a blend of low density polyethylene and very low density polyethylene; polystyrene; ethylene-vinyl acetate copolymer; a blend of ethylene-vinyl acetate copolymer and linear low density polyethylene; cyclic-olefin copolymer; styrene-butadiene copolymer; or, polypropylene random copolymer, provided that the skin layers are devoid of a homogeneously branched polyethylene resin prepared with a single site catalyst; and (c) the film has a haze value of less than about 15%, a 2% secant modulus greater than about 50,000 psi and a cross-directional shrinkage greater than 0%, with the proviso that the hot-blown film process does not comprise double-bubble or tenter-frame orientation processes.

In another preferred embodiment, the invention is a process for preparing a film having at least 3 layers, the process comprising the step of coextruding, via a hot-blown film process, a film comprising at least one inner layer between two skin layers, wherein: (a) the inner layer, or layers, comprises at least one stiffening polymer selected from the group consisting of: low density polyethylene, linear low density polyethylene, high density polyethylene, blends thereof, polypropylene homopolymer, polypropylene random copolymer, styrene/butadiene copolymer, polystyrene, ethylene-vinyl acetate copolymer and cyclic-olefin copolymer, provided that when more than one inner layer is present, the inner layers can be the same or different; and, (b) the skin layers, which may be the same or different, comprise at least one of: low density polyethylene; a blend of low density polyethylene and linear low density polyethylene; a blend of low density polyethylene and very low density polyethylene; polystyrene; ethylene-vinyl acetate copolymer; a blend of ethylene-vinyl acetate copolymer and linear low density polyethylene; cyclic-olefin copolymer; styrene-butadiene copolymer; or, polypropylene random copolymer, provided that the skin layers are devoid of a homogeneously branched polyethylene resin prepared with a single site catalyst; and (c) the film has a haze value of less than about 5%, a 2% secant modulus greater than about 50,000 psi and a cross-directional shrinkage greater than 0%, with the proviso that the hot-blown film process does not comprise double-bubble or tenter-frame orientation processes.

Figure 1:
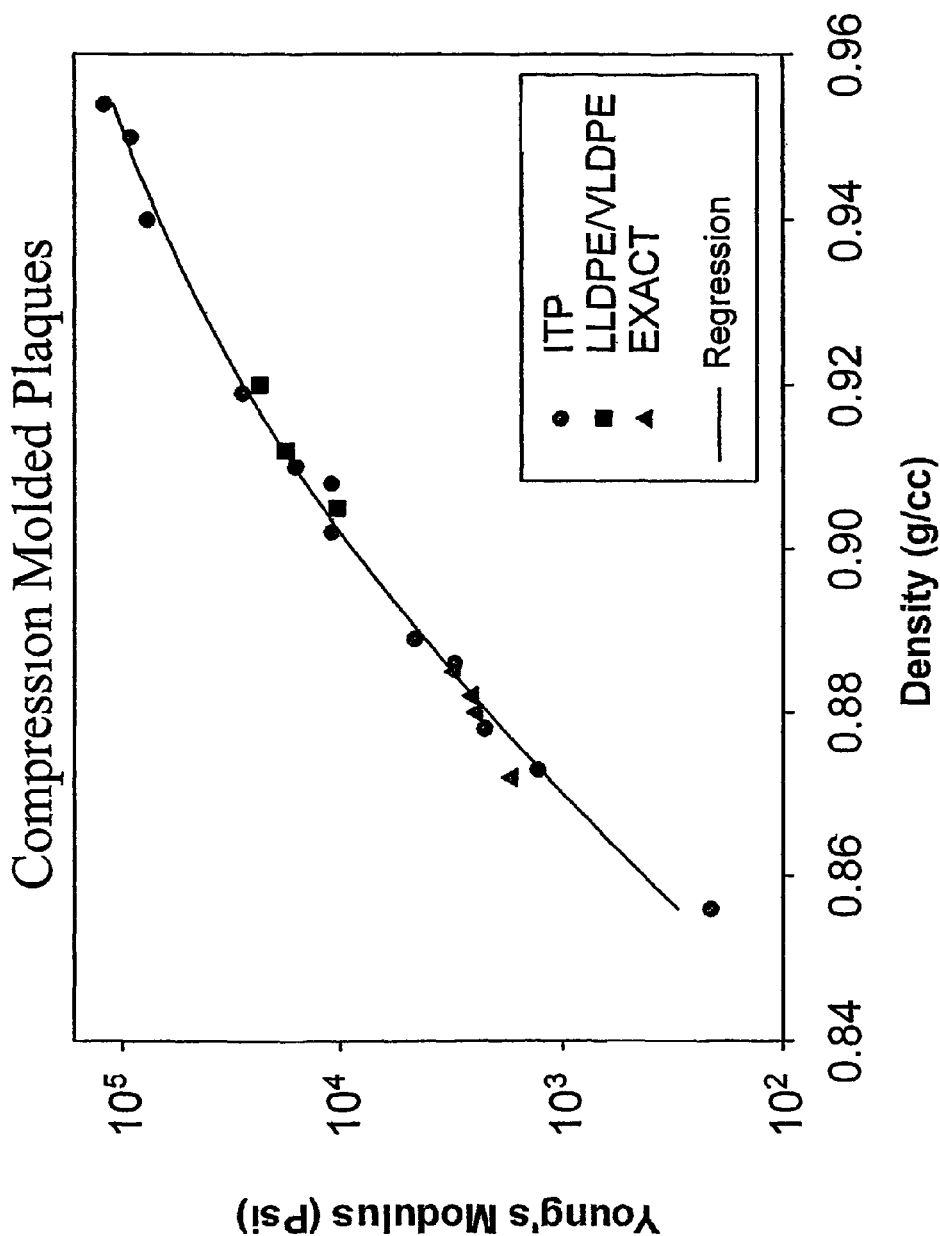
FIG. 1 shows a graph of Young's modulus as a function of polyethylene density.

The polymer resins usable in this invention are polyethylenes, polypropylene random copolymer (PPRCP), styrene/butadiene copolymers (SBC), polystyrene, ethylene-vinyl acetate copolymers (EVA) and cyclic/olefin copolymers (COC).

Polyethylenes usable to this invention fall into two broad categories, those prepared with a free radical initiator at high temperature and high pressure, and those prepared with a coordination catalyst at high temperature and relatively low pressure. The former are generally known as LDPE and are characterized by branched chains of polymerized monomer units pendant from the polymer backbone. LDPE polymers generally have a density between about 0.910 and 0.940 g/cm$^3$. Polymer density is measured according to the procedure of ASTM D-792 herein unless otherwise noted.

Ethylene polymers and copolymers prepared by the use of a coordination catalyst, such as a Ziegler Natta or Phillips catalyst, are generally known as linear polymers because of the substantial absence of branch chains of polymerized monomer units pendant from the backbone. Linear copolymers of ethylene and at least one a-olefin of 3 to 12 carbon atoms, preferably of 4 to 8 carbon atoms, are also well known and commercially available. As is well known in the art, the density of a linear ethylene/a-olefin copolymer is a function of both the length of the a-olefin and the amount of such monomer in the copolymer relative to the amount of ethylene, the greater the length of the a-olefin and the greater the amount of a-olefin present, the lower the density of the copolymer. LLDPE is typically a copolymer of ethylene and an a-olefin of 3 to 12 carbon atoms, preferably 4 to 8 carbon atoms (e.g., 1-butene, 1-octene, etc.), that has sufficient a-olefin content to reduce the density of the copolymer to that of LDPE (e.g., about 0.910 g/cm$^3$ to about 0.940 g/cm$^3$). When the copolymer contains even more a-olefin, the density will drop below about 0.91 g/cm$^3$ and these copolymers are known interchangeably as ultra low density polyethylene (ULDPE) or VLDPE. The densities of VLDPE or ULDPE polymers generally range from about 0.87 to 0.91 g/cm$^3$. Both LLDPE and VLDPE or ULDPE are well known in the art, as are their processes of preparation. For example, heterogeneous LLDPE can be made using Ziegler-Natta catalysts in a slurry, gas phase, solution or high pressure process, such as described in U.S. Pat. No. 4,076,698 while homogeneous linear ethylene polymers can be made as described in U.S. Pat. No. 3,645,992. Such linear ethylene polymers are available from, for example, The Dow Chemical Company as DOWLEX™ LLDPE and as ATTANE™ ULDPE resins. All U.S. patent references in this paragraph are incorporated herein by reference.

High density polyethylene (HDPE), generally having a density of about 0.941 to about 0.965 g/cm$^3$, is typically a homopolymer of ethylene, and it contains few branch chains relative to the various linear copolymers of ethylene and an a-olefin. HDPE is well known, commercially available in various grades, and may be used in this invention. Examples of suitable commercial HDPE resins are DGDH1059 and DMDA 6320 available from The Dow Chemical Company.

As shown in FIG. 1, the modulus of polyethylenes increase as the resin density increases. FIG. 1 shows Young's modulus. The corresponding 2% secant modulus would be slightly lower.

The polypropylene copolymers of this invention are polymers comprising units derived from propylene and ethylene and/or one or more unsaturated comonomers. The term "copolymer" includes terpolymers, tetrapolymers, etc. "Random copolymer" means a copolymer in which the monomer is randomly distributed across the polymer chain. Typically, the polypropylene copolymers comprise units derived from propylene in an amount of at least about 60, preferably at least about 70 and more preferably at least about 80, wt % of the copolymer. Ethylene and/or the one or more unsaturated comonomers of the copolymer comprise at least about 0.1, preferably at least about 1 and more preferably at least about 3, weight percent, and the typical maximum amount of unsaturated comonomer does not exceed about 40, and preferably it does not exceed about 30, wt % of the copolymer. Such random copolymers of polypropylene are commercially available, for example, DOW PolyPropylene RESiNS™ available from The Dow Chemical Company.

Styrene/butadiene copolymers (SBC) are clear resins known in the art. SBC resins provide both high clarity and good film stiffness. Examples of suitable SBC resins are the K-Resin® family of SBC available from Chevron Phillips Chemical Company LP.

Cyclic-Olefin copolymers (COC) are amorphous, glass-clear copolymers of ethylene and norbornene made via metallocene catalysts. COC resins provide good stiffness and high clarity. COC is commercially available, for example, the Topas® COC copolymers available from Ticona.

Polystyrene is a transparent resin well known in the art and commercially available. Polystyrene provides both high-clarity and good film stiffness. An example of a suitable, commercially available polystyrene is Styron™ 663 polystyrene available from The Dow Chemical Company.

Ethylene-vinyl acetate copolymers are well-known, commercially available elastomers.

The inventive coextruded films comprise a core layer sandwiched between two skin layers. One or more intermediate layers may also be sandwiched between the two skin layers. The film structure can have any number of layers greater than or equal to three. Preferably, the film structure is either 3 layers or 5 layers. When a 3 layer film structure is used, the structure can be either A/B/A (the skin layers are the same resin) or A/B/C (the skin layers are different resins). When a 5 layer structure is used (i.e., a core layer and 2 intermediate layers sandwiched between 2 skin layers) the preferred structures are A/B/C/B/A (the skin layers are the same resin and the intermediate layers are the same resin) or A/B/C/D/E (all layers are different resins).

The inner layer, or layers, comprises at least one stiffening polymer selected from the group consisting of: LDPE, LLDPE, HDPE, blends thereof, PPRCP, SBC, polystyrene, EVA and COC, provided that when more than one inner layer is present, the inner layers can be the same or different. In a preferred embodiment, the LDPE of the inner layer or layers has a melt index, $I_2$, of less than or equal to about 1.0 g/10 min. as measured by ASTM D 1238 (Condition 2.16 kg/190 C.). When the film structure is more than 3 layers, the core layer is preferably at least one of HDPE, PPRCP, SBC, polystyrene or COC.

The skin layers, which may be the same or different, comprise at least one of: LDPE; a blend of LDPE and LLDPE; a blend of LDPE and VLDPE; polystyrene; EVA; a blend of EVA and LLDPE; COC; SBC; or, PPRCP, provided that the skin layers are devoid of a homogeneously branched polyethylene resin prepared with a single site catalyst. Homogeneously branched polyethylene resins prepared with a single site catalyst are expensive and are typically harder to process than resins prepared without single site catalysts. A hallmark of the current invention is the obtaining of desirable optical and physical properties without the use of such expensive resins in the outer layers of the film.

Film clarity is highly influenced by the skin layers. For the higher clarity embodiments of this invention, the skin layers preferably comprise polystyrene, SBC or COC.

The inventive films are suitable for use as high clarity retail shrink films, beverage over wraps and other shrink bundling applications.

For beverage overwrap uses, the inventive film has good optical quality as indicated by a haze value of less than about 15%, preferably less than about 10%, as measured by ASTM D-1003. The inventive film also has good stiffness as represented by a 2% secant modulus greater than about 50,000 psi, preferably at least about 100,000 psi, as measured by ASTM D-638. Additionally, the inventive film has good shrinkage as shown by an average maximum cross-directional shrinkage greater than 0%, preferably at least about 0-10%, more preferably at least about 0-50%, as measured by ASTM D-2732. The inventive film can be produced with these properties without the use of post-biorientation.

For retail, high clarity shrink films, the inventive film has good optical quality as indicated by a haze value of less than about 5% as measured by ASTM D-1003. The inventive film also has good stiffness as represented by a 2% secant modulus greater than about 50,000 psi, preferably at least about 100,000 psi, as measured by ASTM D-638. Additionally, the inventive film has good shrinkage as shown by an average maximum cross-directional shrinkage greater than 0%, preferably at least about 20%, as measured by ASTM D-2732. The inventive film should also have a high cross-directional shrink force of at least 5 psi, preferably at least 10 psi. The inventive film can be produced with these properties without the use of post-biorientation.

The inventive films are made by blown film extrusion. The technique of blown film extrusion is well known for the production of thin plastic films. In an advantageous process, plastics are extruded through a circular die to form a film. Air is introduced through the center of the die to maintain the film in the form of a bubble which increases the diameter of the film about 2 to 6 fold, after which the bubble is collapsed onto rollers. The ratio of the diameter of the bubble to the diameter of the die is known as the blow-up ratio (BUR). There are a number of variations of such a process within the skill in the art, for instance as described in such references as U.S. Pat. Nos. 3,959,425; and 4,820,471 where the difference between high (referred to as "long stalk" therein) and low stalk film blowing is discussed at column 1; U.S. Pat. No. 5,284,613; and W. D. Harris, et al in "Effects of Bubble Cooling on Performance and Properties of HMW-HDPE Film Resins", Polymers, Laminations & Coatings Conference, Book 1, 1990, pages 306-317, and Moore, E. P., Polypropylene Handbook, Hanser, New York, 1996, pages 330-332. All U.S. patents recited in this paragraph are hereby incorporated by reference.

In the formation of blown films, a melt enters a ring-shaped die either through the bottom or side thereof. The melt is forced through spiral grooves around the surface of a mandrel inside the die and extruded through the die opening as a thick-walled tube. The tube is expanded into a bubble of desired diameter and correspondingly decreased thickness as previously described.

The formation of coextruded blown films is known in the art and applicable to the present invention. Articles illustrative of the art include Han and Shetty, "Studies on Multilayer Film Coextrusion III. The Rheology of Blown Film Coextrusion," Polymer Engineering and Science, February, (1978), vol. 18, No. 3 pages 187-199; and Morris, "Peel Strength Issues in the Blown Film Coextrusion Process," 1996 Polymers, Laminations & Coatings Conference, TAPPI Press, Atlanta, Ga. (1996), pages 571-577. The term "coextrusion" refers to the process of extruding two or more materials through a single die with two or more orifices arranged such that the extrudates merge together into a laminar structure, preferably before chilling or quenching. Coextrusion systems for making multilayer films employ at least two extruders feeding a common die assembly. The number of extruders is dependent upon the number of different materials comprising the coextruded film. For each different material, a different extruder is advantageously used. Thus a five-layer coextrusion may require up to five extruders although less may be used if two or more of the layers are made of the same material.

Coextrusion dies are used to form coextruded blown films. They have multiple mandrels that feed the different melt streams to the circular die lip. When feedblocks are employed to stack melt layers from two or more extruders, the resulting multilayered melt stream is then fed to the film die.

A hallmark of the current invention is the lack of post-biorientation, such as double-bubble or tenter frame orientation.

The shrinkage test is performed by immersion in hot oil bath kept at a temperature of at least 10 C. above the melting point of the highest melting point layer for at least 30 seconds.

EXAMPLES

The following resins were used in the production of the films of the Examples.

| | |
|---|---|
| LDPE 501I | A clarity grade LDPE having a melt index, $I_2$, of 1.90 g/10 min (measured by ASTM D-1238), a density of 0.922 g/cm$^3$ (measured by ASTM D-792), available from the Dow Chemical Co. |
| LDPE 136S | An LDPE having a melt index, $I_2$, of 0.25 g/10 min (measured by ASTM D-1238), a density of 0.922 g/cm$^3$ (measured by ASTM D-792) available from the Dow Chemical Co. |
| LDPE 170A | An LDPE having a melt index, $I_2$, of 0.70 g/10 min (measured by ASTM D-1238) and a density of 0.9235 g/cm$^3$ (measured by ASTM D-792) available from the Dow Chemical Co. |
| LDPE 662I | An LDPE having a melt index, $I_2$, of 0.50 g/10 min (measured by ASTM D-1238) and a density of 0.919 g/cm$^3$ (measured by ASTM D-792) available from the Dow Chemical Co. |
| Dowlex 2038 | An LLDPE having a melt index, $I_2$, of 1.0 g/10 min (measured by ASTM D-1238) and a density of 0.935 g/cm$^3$ (measured by ASTM D-792)) available from the Dow Chemical Co. |
| Dowlex 2049AC | An LDPE having a melt index, $I_2$, of 1.0 g/10 min (measured by ASTM D-1238) and a density of 0.926 g/cm$^3$ (measured by ASTM D-792)) available from the Dow Chemical Co, |
| DGDH 1059 | An HDPE resin having a melt index of about 0.85 g/10 minutes and a density of about 0.962 g/cc |
| PP DS4D05: | A polypropylene random copolymer having good gloss and clarity, low seal initiation temperature and a melt flow rate of 6.5 g/10 min measured by ASTM D-1238 (230° C./2.16 kg) available from the Dow Chemical Co. |
| PP DS6D82 | A polypropylene random copolymer having good optical properties, low temperature heat seal and a melt flow rate of 7.0 g/10 min measured by ASTM D-1238 (230° C./2.16 kg) available from the Dow Chemical Co. |
| Topas 8007: | A cylic-olefin copolymer resin having a density of 1.020 g/cm$^3$ (measured by ISO 1183) and a melt flow rate of 30 g/10 min (measured by ISO 1133) available from Ticona. |
| K-resin: | DK 11 and DK 13 (styrene/butadiene block copolymers) available from Chevron-Phillips |

Example 1 and Comparative Samples A and B

Example 1 was three-layer film produced with an A/B/A structure. LDPE 501I was used for the skin layer and Dowlex™ 2038 was used in the core layer. The co-extrusion conditions used to make Example 1 were as follows: Die Gap: 50 mils, Layer Ratio: 15/70/15%, Production Rate: 225 lb/hr=9 lb/hr-die circumference (inches) used to make Example 1 were as follows: Melt Temperature: 440/420/440° F. The BUR was either 2.5 or 3.5.

Comparative Sample A was produced under the same conditions as Example 1 except that only a BUR of 2.5 was used. LDPE 1321 was used in the skin layer and Marlex D350 was used as the core layer.

Comparative Sample B was produced under the same conditions as Example 1. LDPE 170A was used in the skin layers and Dowlex™ 2038 was used in the core layer.

Figure 2:
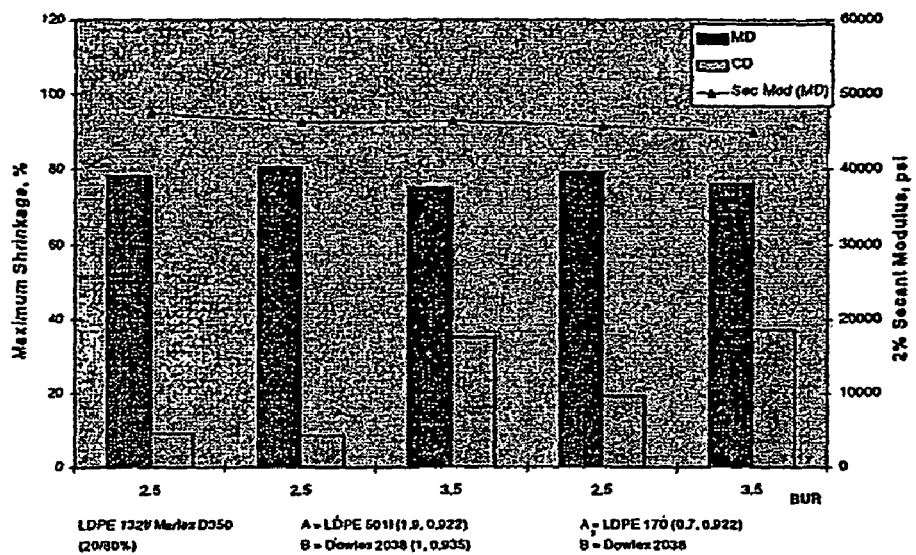
FIG. 2 shows a bar graph of shrinkage and 2% secant modulus for three films.
Figure 3:
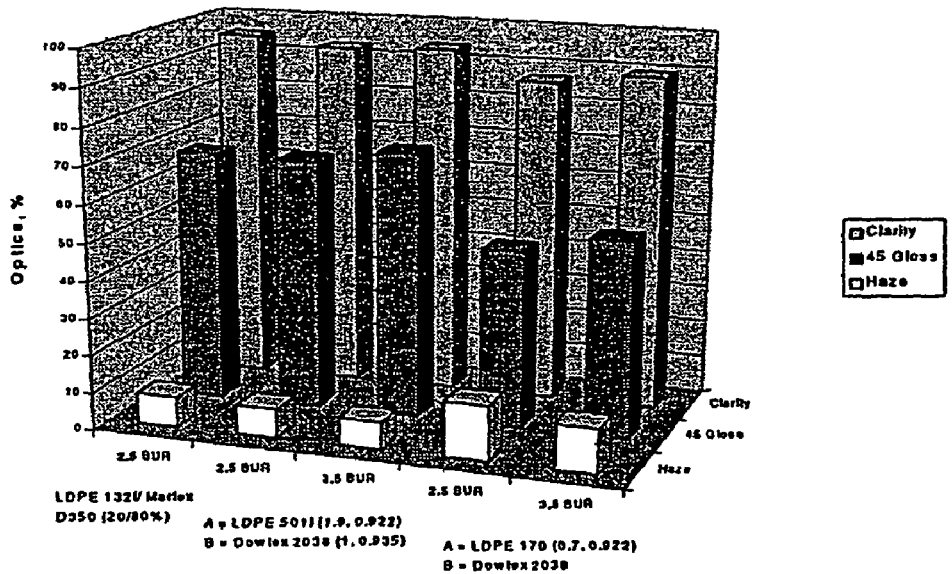
FIG. 3 shows a bar graph of optic data for the three films of FIG. 2.

Shrinkage and 2% secant modulus data for the three films is shown in FIG. 2. Optic data for the three films is shown in FIG. 3. LDPE 501I based films exhibited better optics than LDPE 170A based films. LDPE 501I based films exhibited adequate CD shrinkage (CD shrinkage=0-10%). Hence, Clarity grade LDPE when used by itself is preferred in outer layers for obtaining better optics.

Examples 2-4 and Comparative Samples C-K

Additional examples of 3-layer structures of the current invention with one comparative example CS F (from U.S. Pat. No. 6,187,397 B1) are shown in Table I. The examples illustrate 3-layer films exhibiting high stiffness and high clarity with adequate shrinkage desired for beverage over-wrap, shrink bundling, and high clarity shrink films.

TABLE I 3-layer high clarity, high stiffness film results.

| Name | SKINS* | CORE | BUR | HAZE % | 2% SECANT psi | SHRINKAGE % 150° C. Avg. (MD) | SHRINKAGE % 150° C. Avg. (CD) | SHRINKAGE % 140°/C. Avg. (CD) |
|---|---|---|---|---|---|---|---|---|
| CS C | LDPE 501I | Dowlex 2038 | 2.5 | 8.11 | 46420 | 73.15 | −8.3 | 9.75 |
| CS D | LDPE 501I | Dowlex2038/LDPE 136S (80/20%) | 2.5 | 7.71 | 43392 | 80.55 | 4.55 | 2.55 |
| CS E | LDPE 501I | Dowlex2049AC/LDPE 136S (80/20%) | 2.5 | 7.2 | 32528 | 77.85 | 1.3 | −3.3 |
| Ex 2 | LDPE 501I | DEGD 1059/LDPE 136S (50/50%) | 2.5 | 10 | 59518 | 82.8 | 10.95 | 14.1 |

TABLE I-continued 3-layer high clarity, high stiffness film results.

| Name | SKINS* | CORE | BUR | HAZE % | 2% SECANT psi | SHRINK-AGE % 150° C. Avg. (MD) | SHRINK-AGE % 150° C. Avg. (CD) | SHRINK-AGE % 140°/C. Avg. (CD) |
|---|---|---|---|---|---|---|---|---|
| Ex 3 | LDPE 5011 | DEGD 1059/LDPE 136S (80/20%) | 2.5 | 12.8 | 84587 | 80.55 | 2.3 | 1.3 |
| CS F | LDPE 5011/Dowlex 2045A (20/80%) | Dowlex 2049AC/LDPE 136S (80/20%) | 2.5 | 4.6 | 33738 | 77.85 | −5.8 | −3.6 |
| CS G | PP DS 6D82 | LDPE 136S | 2.5 | 13.9 | 40524 | 84.7 | 30.6 | 21.25 |
| CS H | PP DS 6D82 | LDPE 136S | 3.6 | 14.4 | 36712 | 80.8 | 52.75 | 43.65 |
| Ex 4 | PP DS 6D82 (A = 20% Skin) | LDPE 136S | 2.5 | 6.12 | 52326 | 83.8 | 25.15 | 13.9 |
| CS I | PP DS 6D82 | LDPE 6621 | 2.5 | 11.7 | 40967 | 80.8 | 16.8 | 21.25 |
| CS J | PP DS 6D82 | Dowlex 2038/LDPE 136S (80/20%) | 2.5 | 5.36 | 52050 | 78.55 | −4.35 | −4.1 |
| CS K | PP DS 4 D05 | LDPE 136S | 3.6 | 7.79 | 39888 | 80.8 | 45.9 | 47.85 |

*Skin layers each - % except for Example 4

Examples 5-10 and Comparative Sample L 5-layer high clarity, high stiffness films were produced on a conventional coextrusion blown film line without post-biorientation. The films all had an A/B/C/B/A film structure. The layers of the films had the components and percentage (of total film thickness) as shown in Table II. All of the films had an overall thickness of 1.5 mil.

As shown in Table II, Examples 5-10 illustrate that high clarity, high stiffness films can be made by means of the current invention without resorting to post-biorientation processes.

Examples 11-15

Example 1

Various 3-layer structures were made using Dow Polystyrene Styron™ 663 and K-resin (K-13) in skin-layers. LDPE 132I or a blend of Dowlex 2045 with LDPE 132I was used in core layer. The properties of the structures are shown in Table III.

Typical co-extrusion conditions for Examples 11-15 were: Die Gap: 50 mils, Layer Ratio: 15/70/15%, Production Rate: 225 lb/hr=9 lb/hr-circ, Melt Temperature: 440/420/440° C., Film thickness=1.5 mil.

The data in Table III show that multi-layer films comprising polystyrene or K-resin in skin layers exhibit excellent combination of optics, stiffness and shrink properties, especially at blow up ratio greater than 3.

TABLE II 5-layer high clarity, high stiffness film results

| Example No. | A = Skin/ % of total thickness | B = Inner/ % of total thickness | C = Core/ % of total thickness | BUR | Haze | 2% Secant Modulus | Shrink Tension 150 C. (MD) | Shrink Tension 150 C. (CD) | Shrinkage % 150° C. Avg. (MD) | Shrinkage % 150° C. CD Avg. (CD) |
|---|---|---|---|---|---|---|---|---|---|---|
| 5 | LDPE 5011/10% | LDPE 136S/20% | HDPE DEGD 1059/40% | 2.5 | 10.67 | 62058 | 16.4 | very low | 79.8 | 14.4 |
| CS L | LDPE 5011/10% | LDPE 136S/20% | PP DS 6D82/40% | 2.5 | 7.50 | 45939 | 18.4 | very low | 81.05 | 29.1 |
| 6 | PP DS 4D05/10% | LDPE 136S/30% | PP DS 4D05/20% | 3.6 | 4.54 | 62438 | 23.6 | very low | 81.8 | 54.7 |
| 7 | PP DS 6D82/10% | LDPE 6621/30% | PP DS 6D82/20% | 3.6 | 7.86 | 53565 | 20.0 | very low | 82.05 | 38.7 |
| 8 | PP DS 6D82/10% | LDPE 136S/30% | Topas 8007/20% | 3.6 | 7.99 | 136365 | 25.4 | 13.6 | 73.9 | 40.7 |
| 9 | PP DS 6D82/10% | LDPE 136S/30% | K-resin/20% | 3.6 | 6.75 | 59412 | 23.8 | 8.5 | 72.9 | 51.3 |
| 10 | PP DS 6D82/10% | LDPE 136S/30% | Topas 8007/20% | 3.6 | 6.77 | 127784 | 24.9 | 13.2 | 75.15 | 41.6 |

Layer percentages are per layer and are target values.

Examples 8 and 10 are the same except that the actual layer ratio due to changed extruder screw rpm's. As a result, the core thickness in Example 10 is less than in Example 8.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

TABLE III

Polystyrene in Skin Layers

| Test Name | | Example No. | | | | |
|---|---|---|---|---|---|---|
| | | 11 | 12 | 13 | 14 | 15 |
| | Skins | Styron 663 | Styron 663 | Styron 663 | Styron 663 | K-13 |
| | Core | LDPE 132I | LDPE 132I | DIx 2045 | DIx 2045 | DIx 2045 |
| | BUR | 2.5 | 3.2 | 3.2 | 2.5 | 2.5 |
| | MD/CD Shrinkage @ 120° C., % | 44/15 | 42/24 | 31/15 | 44/7.5 | — |
| | MD/CD shrink tension @ 150° C., Psi | 72/6 | 49/12 | 43/14 | 59/7 | — |
| Clarity @ B-3833 | Average Clarity @ B3833 | 93.28 | 98.58 | 97.18 | 98.53 | 91.43 |
| Gloss-45 deg @ B-3833 | Average Gloss 45 deg @ B-3833 | 123.8 | 116.5 | 118.5 | 115.6 | 107.5 |
| Haze @ B-3833 | Average Haze @ B-3833 | 1.79 | 1.437 | 2.55 | 2.63 | 3.147 |
| Secant Modulus-CD @ B-3833 | Avg 2% SECANT (PSI) | 128445 | 125653 | 129153 | 130077 | 47204 |

What is claimed is:

1. A coextruded hot-blown film having at least three layers, the film comprising:
   a core layer sandwiched between two skin layers, the film having a haze value of less than about 15% as measured by ASTM-D-1003, a 2% secant modulus greater than about 50,000 psi as measured by ASTM-D-638, and a cross-directional (CD) shrinkage greater than 0% psi as measured by ASTM-D-2732, wherein:
   (a) the core layer is a member selected from the group consisting of high density polyethylene with a density from 0.941 g/cm$^3$ to 0.965 g/cm$^3$, a blend of low density polyethylene and high density polyethylene with a density from 0.941 g/cm$^3$ to 0.965 g/cm$^3$, and cyclic-olefin copolymer and,
   (b) the skin layers, which may be the same or different, each skin layer composed of a single component selected from the group consisting of low density polyethylene, polystyrene, cyclic-olefin copolymer, styrene-butadiene block copolymer, and polypropylene random copolymer, provided that the skin layers are devoid of a homogeneously branched polyethylene resin prepared with a single site catalyst.

2. The film of claim 1 wherein the cyclic-olefin copolymer is an ethylene-norbornene copolymer.

3. The film of claim 1 wherein the film has a haze value of less than about 5%.

4. The film of claim 1 wherein the film is characterized by a cross-directional shrink force of at least about 6 psi.

5. The film of claim 1 having a 2% secant modulus greater than about 100,000 psi.

6. The film of claim 1 having a cross-directional shrink of between 0% and about 50%.

7. The film of claim 1 wherein the low density polyethylene of the inner layer or layers has a melt index, $I_2$, of less than or equal to 1.0 as measured by ASTM D-1238.

8. The film of claim 1 wherein the film has 3 layers.

9. The film of claim 8 having a film structure of A/B/A.

10. The film of claim 8 having a film structure of A/B/C.

11. The film of claim 8 having a 2% secant modulus greater than about 60,000 psi.

12. The film of claim 8 having a 2% secant modulus greater than about 70,000 psi.

13. The film of claim 8 having a 2% secant modulus greater than about 80,000 psi.

14. The film of claim 8 having a 2% secant modulus greater than about 100,000 psi.

15. The film of claim 8 having a cross-directional shrink of between 0% and about 50%.

16. A coextruded hot-blown film having at least three layers, the film comprising a core layer and, at least one other inner layer sandwiched between two skin layers, the film having a haze value of less than about 15% as measured by ASTM-D-1003, a 2% secant modulus greater than about 50,000 psi as measured by ASTM-D-638 and a cross-directional (CD) shrinkage greater than 0% as measured by ASTM-D-2732, wherein
   (a) the core layer is a blend of low density polyethylene and high density polyethylene with a density from 0.941 g/cm$^3$ to 0.965 g/cm$^3$; and,
   (b) each skin layer consists of low density polyethylene, provided that the skin layers are devoid of a homogeneously branched polyethylene resin prepared with a single site catalyst.

17. The film of claim 16 having a 2% secant modulus greater than about 100,000 psi.

18. The film of claim 16 having a cross-directional shrink of between 0% and about 50%.

19. The film of claim 16 having a haze value of less than about 5%.

20. The film of claim 16 having a film structure of A/B/C/B/A or A/B/A.

21. The film of claim 16 wherein the film is characterized by a cross-directional shrink force of at least about 6 psi.

* * * * *